United States Patent [19]

Teter

[11] 3,776,638
[45] Dec. 4, 1973

[54] VEILING GLARE MEASUREMENT SYSTEM AND METHOD

[75] Inventor: Michael P. Teter, Horseheads, N.Y.

[73] Assignee: Corning Glass Works, Corning, N.Y.

[22] Filed: Sept. 1, 1972

[21] Appl. No.: 285,846

[52] U.S. Cl.............. 356/124, 356/103, 356/209, 356/212, 356/256
[51] Int. Cl. ............................................ G01b 9/00
[58] Field of Search............ 356/103, 104, 124–127, 356/209, 212, 213, 215, 218, 225, 226, 229, 256

[56] References Cited
UNITED STATES PATENTS

| 3,100,239 | 8/1963 | Courtney-Pratt | 356/124 |
| 3,703,338 | 11/1972 | Breneman | 356/222 |

Primary Examiner—David Schonberg
Assistant Examiner—F. L. Evans
Attorney—Clarence R. Patty, Jr. et al.

[57] ABSTRACT

Photoelectric system and method for measuring the veiling glare from optical lens, such system comprising a pair of photosensitive devices disposed in a camera obscura and associated electrical circuitry for making a comparison measurement of light intensity striking first and second ones of the photosensitive devices from the optical lens when held in the lens-aperture of the camera obscura and the camera obscura is focused at an illuminated reflective screen having a light trap in the vicinity of the center of the screen. An indication or visual display of the results of the comparison measurement may be given by a suitable meter, pen graph or any suitable indication device.

10 Claims, 2 Drawing Figures

PATENTED DEC 4 1973 3,776,638

3,776,638

VEILING GLARE MEASUREMENT SYSTEM AND METHOD

BACKGROUND OF THE INVENTION

Light scattering from optical lenses, such as lenses used in cameras for example, is usually due to so-called veiling glare and is a major source of loss of contrast and, therefore, undesirable in such a type of lens. Measurements are, therefore, usually made to determine or measure the veiling glare of each respective lens and, heretofore, such measurements have usually been performed photographically. Such a method of measuring said veiling glare is substantially time consuming and, therefore, relatively expensive. Accordingly, it is an object of the present invention to provide a system for measuring veiling glare from lenses of the type mentioned, as well as other types, such system providing a very substantial reduction in the time required for each measurement.

It is another object of the present invention to provide a system for and method of determining or measuring the light scattering or veiling glare from optical lenses, such system greatly reducing the chance or percentage of error over the photographic system heretofore used for such measurements.

It is still another object of the present invention to provide a measurement system such as that stated and which does not require the use of expendable materials such as photographic films for example.

Other objects and characteristics of the invention will become apparent as the description proceeds.

SUMMARY OF THE INVENTION

The invention is believed to be adequately summarized in the foregoing abstract of the disclosure and, therefore, to obviate redundancy or repetition, no further summary of the invention is considered necessary nor will be given.

BRIEF DESCRIPTION OF THE DRAWINGS

In the drawings.

Similar reference characters refer to similar parts in each of the figures of the drawings.

PREFERRED EMBODIMENT OF THE INVENTION

Figure 1:
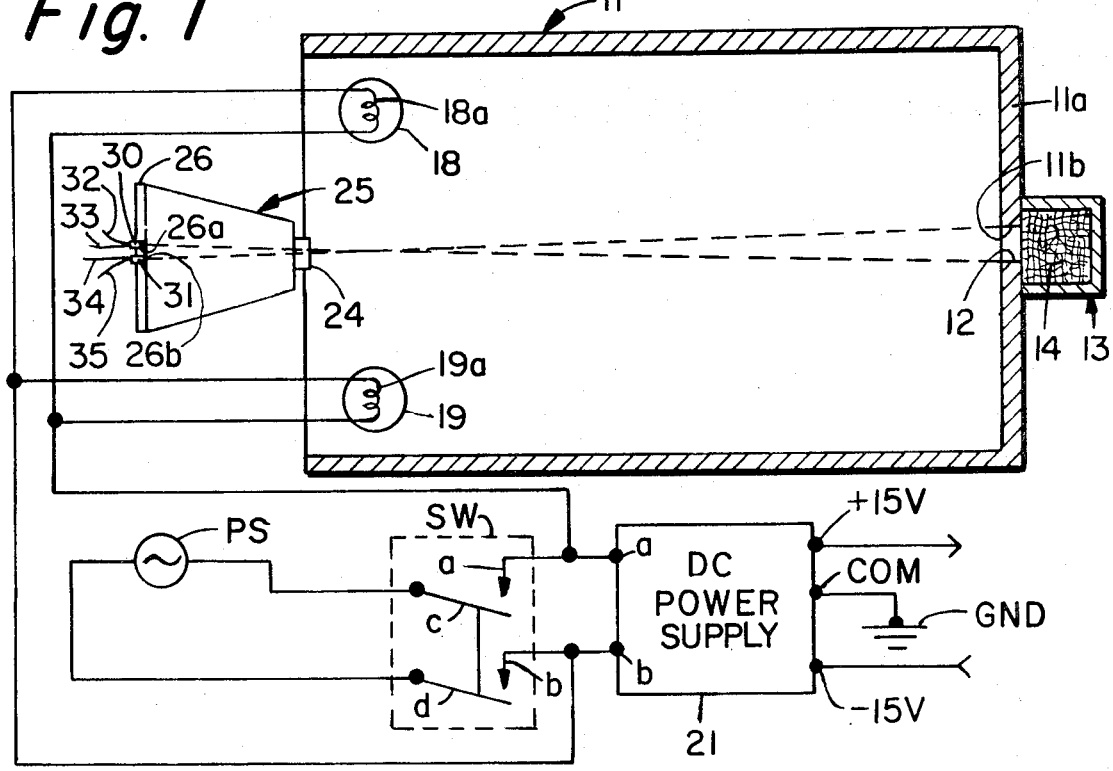
FIG. 1 is a cross-sectional and somewhat schematic view of an apparatus embodying the inventive system disclosed.

Referring to the drawings in detail, there is shown in FIG. 1 in cross-section a box 11 having one open end and an aperture or orifice 12 in end wall 11a of the box in the vicinity of the center of such end wall, such orifice or aperture 12 extending completely through said end wall 11a. A light trap 13 is also shown in cross-section in FIG. 1, such light trap comprising, for example, an open-ended box or container which is filled with a crumpled black velvet material 14. The open end of such box 13 is fastened or held against the outer surface of said end wall 11a of box 11 in a light-proof manner so as to receive and entrap, to the maximum possible extent, any light transmitted through orifice or aperture 12 of box 11 from a pair of lamps such as 18 and 19 to be hereinafter discussed. The interior or inner surfaces of the walls of box 11, including the inner surface of end wall or end 11a, of the box, are reflective surfaces preferably having a maximum reflectivity. Such surfaces may, for example, comprise a white paint applied to said walls and having a reflectivity in excess of 99 percent.

The perimetric surface 11b defining the perimetric bounds of said orifice or aperture 12 in end wall 11a of box 11 is provided with optimum light-absorbing properties as by a suitable black paint applied to such surface or by a black velvet material lining such aperture 12. The dimensions of box 11 depend, somewhat, on the focal range of the lens or lenses whose veiling glare is to be measured. If, for example, the focal range of said lens or lenses is on the order of 5 feet the length of the interior of box 11 is, for example, about 5 feet and the interior width and height of the box may, for example, be on the order of 3 feet. In such case, said aperture or orifice 12 may, for example have a diameter on the order of 2 inches and said light trap 13 may, for example, be 6 inches square. Such dimensions are not extremely critical however as will be readily recognized by those skilled in the art.

As previously mentioned, a pair of lamps, such as 18 and 19, and which are preferably spot lights are located adjacent the open end of box 11 so as to illuminate the interior of the box and especially the interior or inner surface of end wall 11a of the box, such end wall in effect forming a reflective screen with a light trap in the vicinity of the center thereof as will be readily apparent to those skilled in the art. The first and second ends of filaments 18a and 19a of lamps 18 and 19, respectively, are connected in multiple to the fixed terminals $a$ and $b$ of a normally open set of contacts of a manually operated electrical switch designated SW, and the movable terminals $c$ and $d$ of such switch are connected across a stabilized power source of alternating current designated PS and having a suitable voltage and capacity for energizing said filaments as well as a direct current power supply unit 21 hereinafter discussed. Said filaments are, of course, deenergized when said contacts of said switch SW are open and become energized when such contacts close upon a manual actuation of switch SW.

The previous mentioned direct current power supply unit 21 has its input terminals $a$ and $b$ connected to said fixed terminals $a$ and $b$, respectively, of switch SW and, thereby, to alternating current or power source PS when switch SW is actuated to a closed condition as mentioned above. Unit 21 is a transformer-rectifier unit having positive (+15V) output and negative (−15V) output terminals and a common (COM) terminal which is connected to an electrical ground designated GND.

Referring further to FIG. 1 of the drawings, there is shown disposed adjacent the center of the open end of box 11 a camera obscura 25 having a lens aperture in the front or one end thereof and adapted to hold an optical lens such as 24 whose veiling glare is to be measured. For purposes of aiding in the focusing of the camera obscura 25, such camera obscura is not fixed in position but is supported in any convenient manner so as to be movable for said purpose. The back or end of camera obscura 25 opposite said one end thereof is preferably a translucent panel or pane 26 of a translucent material such as a ground glass pane or sheet for example. Such a translucent panel or pane is preferable for use as the back of camera obscura 25 for purposes of also aiding in said focusing.

When a pane or panel such as 26 is used as said back of camera obscura 25 it embodies a pair of closely spaced apart and relatively small holes or passages such as 26a and 26b which extend completely through the panel or pane 26 at equal distances on opposite sides of an imaginary line projected between the center of lens 24 and the center of pane or panel 26. Said passages 26a and 26b securely hold first and second photosensitive devices 30 and 31, respectively, with the light-sensitive elements of such devices facing towards the front of the camera obscura 25. Said photosensitive devices 30 and 31 are preferably PIN photodiodes and may, for example, be Series 5082-4220 silicon PIN photodiodes which are manufactured and sold by Hewlett-Packard Company whose address is 620 Page Mill Road, Palo Alto, Cal. 94304. It is pointed out, however, that said photosensitive devices, such as 30 and 31, instead of being photodiodes may each be a photosensitive device such as a photomultiplier, photoconductor, photocell, or phototransistor as will be readily recognized by those skilled in the art. Furthermore, if the back of camera obscura 25 does not comprise a translucent pane or panel as described, the photosensitive devices such as 30 and 31 may be supported in any convenient manner on and adjacent to the center of the inner surface of the back of the camera obscura 25.

Assuming that the photosensitive devices such as 30 and 31 are each a Series 5082-4220 PIN photodiodes as discussed above, such photodiodes each have a diameter of about 0.183 inch and, therefore, if a translucent pane of panel such as 26 is used as the back of the camera obscura 25, said holes or passages such as 26a and 26b extending through the pane of panel 26 may each have a diameter slightly in excess of the aforesaid 0.183 inch for ready insertion of one of said photodiodes in each respective passage and in the previously mentioned position of such devices. The photodiodes are then securely held in said passages in any of the convenient and well-known manners. The photodiodes, of the silicon PIN type described, each include first and second terminals which connect to the anode and cathode, respectively, of the respective photodiode. First and second electrical leads or conductors 32 and 33 are connected to said first and second terminals respectively, of photodiode 30, and first and second electrical leads or conductors 34 and 35 are connected to said first and second terminals, respectively, of photodiode 31. Such leads or conductors and said photodiodes are also shown in the wiring diagram of FIG. 2 of the drawings and the electrical circuitry associated with the photodiodes will be described hereinafter in a discussion of said wiring diagram of FIg. 2.

It is deemed expedient to point out at this point in the description that camera obscura 25 is discussed as being just that. However, if desired or considered expedient to do so, such component (25) may be one of a plurality of cameras of the type or types which are each intended to use a lens such as 24. In such case, said camera is preferably provided with a translucent back such as 26 when such camera is being used as component or camera obscura 25. It is further pointed out that the light trap 13 need not be a box filled with crumpled black velvet 14 as described but any of other well-known types of light traps may be used in place of the light trap shown and described.

Figure 2:
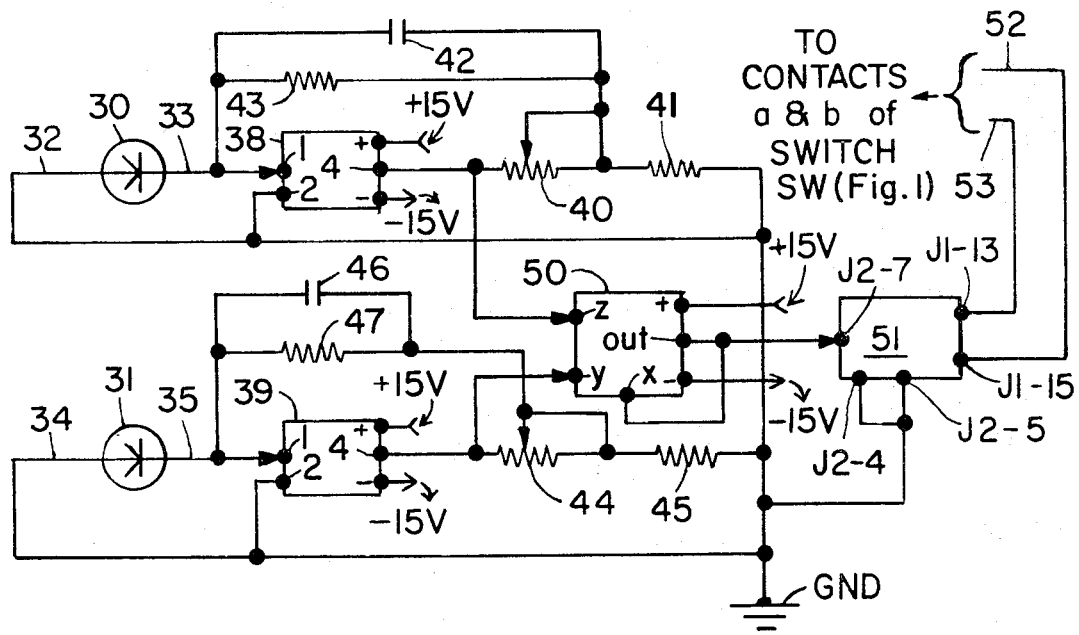
FIG. 2 is a schematic wiring diagram of the electrical apparatus of the system of the invention.

Referring now to FIG. 2, the previously mentioned conductor 32 connected with the anode of photodiode 30 is also connected with the electrical ground GND which is also the electrical ground designated GND and shown in FIG. 1 of the drawings. The previously mentioned conductor 33 connected with the cathode of photodiode 30 is connected with the negative input terminal 1 of a first operational amplifier 38 and the positive input terminal 2 of such amplifier is connected with said electrical ground GND. The (+) and negative (−) terminals of amplifier 38 are connected with said +15V and −15V terminals of previously mentioned transformer-rectifier unit 21. Output terminal 4 of amplifier 38 is connected with an input terminal Z of a multiplier-divider unit 50, to be hereinafter discussed, and thence through the winding of a 100,000 ohm potentiometer 40 with a first end of a 1,000 ohm resistor 41 whose second end is connected to the previously mentioned ground GND. The wiper arm of potentiometer 40 is connected with said first end of resistor 41 and in multiple with first ends of a 0.010 mfd capacitor 42 and a 10,000,000 ohm resistor 43. The second ends of capacitor 42 and resistor 43 connect with each other and with previously mentioned input terminal 1 of amplifier 38 and thereby provide, in conjunction with potentiometer 40, a feedback circuit for amplifier 38.

Referring further to FIG. 2, the previously mentioned conductor 34 connected with the anode of photodiode 31 is also connected with said electrical ground GND. The previously mentioned conductor 35, connected with the cathode of photoconductor 31, is also connected with the negative input terminal 1 of a second operational amplifier 39 and the positive input terminal 2 of such amplifier is connected with said electrical ground GND. The positive (+) and the negative (−) terminals of amplifier 39 are connected with said +15V and −15V terminals of previously discussed unit 21 (FIG. 1). Output terminal 4 of amplifier 39 is connected with an input terminal Y of said unit 50 and through the winding of a 100,000 ohm potentiometer 44 with a first end of a 1,000 ohm resistor 45 whose second end is connected to said ground GND. The wiper arm of potentiometer 44 is connected with said first end of resistor 45 and in multiple with first ends of a 0.010 mfd capacitor 46 and a 1,000,000 ohm resistor 47. The second ends of capactior 46 and resistor 47 connect with each other and with previously mentioned input terminal 1 of amplifier 39 and thereby provide, in conjunction with potentiometer 44, a feedback circuit for amplifier 39. Operational amplifiers such as 38 and 39 are well known in the art and each such amplifier may, for example, be a Teledyne Philbrick Nexus Model 1023/102301 operational amplifier which is obtainable from Teledyne Philbrick whose address is Allied Drive at Route 128, Dedham, Massachusetts 02026.

Previously mentioned multiplier-divider unit 50 may, for example, be a Model 4452 Analog Multiplier set up in a division mode, such multiplier also being obtainable from the above-mentioned Teledyne Philbrick Company. The positive (+) and negative (−) input terminals of unit 50 are connected with said +15V and −15V terminals of said power unit 21. In the division mode setup of multiplier 50, terminal X of the multiplier is connected with the output terminal OUT thereof and such output terminal is connected with the signal input terminal J2–7 of digital panelmeter 51, to be hereinafter discussed and whose terminals J2–4 and J2–5 are connected with each other and with said ground GND. Unit 50 provides at its output terminal OUT a signal Z/Y which has a value representative of the mathematical quotient of the values of signals, supplied from output terminals 4 of amplifiers 38 and 39, to input terminals Z and Y, respectively, of unit 50. This will be further discussed hereinafter in an operation example of the invention.

The above-mentioned panelmeter 51 may, for example, be a digital panelmeter such as is obtainable from Analyogic Corporation whose address is Audubon Road, Wakefield, Mass. 01880. Such a panelmeter gives a visual digital indication representative of the valve of an analog signal supplied to said input terminal J2–7 and, in the present instance, such signal is the previously mentioned signal that is representative of the previously mentioned mathematical quotient of Z/Y. Panel-meter 51 has an internal source of direct current and, therefore, alternating current input terminals J1–13 and J1–15 are connected over electrical leads or conductors 52 and 53 to fixed contacts $a$ and $b$ of switch SW (FIG. 1) and thus across alternating current power source PS shown in FIG. 1 of the drawings. Terminals J2–4 and J2–5 of the panelmeter are connected with each other and with ground GND.

It is pointed out that a digital panelmeter such as 51 need not necessarily be employed for giving an indication of the value of the aforesaid signal Z/Y but such indication may be given by a suitable needle-indicating meter, pen graph etc. as is well known in the art.

The apparatus or system of the invention having been described in detail, several operational examples of the invention will be set forth subsequent to the following general information and discussion.

Assuming that the digital panelmeter previously mentioned is used as component 51, that is, is used as the indication device of the system, the following calibration steps are first performed. 1. Switch SW (FIG. 1) is manually actuated to its closed condition to energize from AC source PS the filaments 18a and 19a of lamps 18 and 19, respectively, and the other components of the system. 2. A lens known to have a high veiling glare is placed in the lens-aperture of camera obscura 25. 3. Camera obscura 25 is positioned and focused so that an image of light trap 13, that is, an image of aperture 12 is beamed at an area of the back of camera obscura 25 adjacent to and preferably in the space between photodiodes 30 and 31 as indicated by the dashed lines in FIG. 1. 4. Both the gain knobs on the panelmeter are turned clockwise all of the way. 5. The top gain knob on the panelmeter is turned counterclockwise so that such meter reads 10.00. 6. Camera obscura 25 is moved so that said image is beamed at the light sensitive element of photodiode 30, to completely cover such element, and the back of the camera is then covered with a black velvet cover. 7. A second reading of the meter is taken and the top gain knob of the meter is turned clockwise until the meter reads 10 times the second reading. If such manipulation does not result in a sufficiently high reading (10 times the second reading) then, and only then, the bottom or lower gain knob on the meter is turned counter-clockwise until the desired reading results. The meter will then read veiling glare, in percent, as further discussed hereinafter.

Following the above calibration steps, the above-mentioned high veiling glare lens is replaced with a lens such as 24 whose veiling glare is to be measured or determined, that is, the latter lens is placed in the lens-aperture of camera obscura 25 and the camera obscura is again focused as in step 3 of the calibration procedure outlined above. The camera obscura is then moved as in step 6 of the calibration procedure and the meter will then give in percent a visible digital indication of the veiling glare of said lens such as 24. It is pointed out, at this time, that the measurement of the veiling glare of a lens such as 24 is the measurement of the ratio of light scattered from imperfections in the measured lens to the light which forms the previously mentioned image of aperture 12 in end wall 11a of box 11, such wall being intended to provide a perfectly dark spot (image of aperture 12) in a bright background (light reflected from the inner surface of end wall 11a of box 11). Any light detected in the image of said dark spot is due to said light scattering from a lens such as 24, that is, is due to the veiling glare of such lens. Thus it may be said that the ratio of the light intensity in said image to the light intensity in said bright background multiplied by 100 is the percent of veiling glare from a lens such as 24 being tested.

It is believed expedient to again point out that the veiling glare measurements need not necessarily be given in percent as discussed but such glare may, for example, be given or indicated on a pen graph or a needle-indicating meter, as previously mentioned, and the operator of the system can interpret such an indication as desired, that is, for example, whether the pen graph or meter indicates a "good" or "bad" lens or, in other words, whether the pen graph or needle-indicating meter is giving an indication that a lens being measured is within or without a selected tolerable limit of veiling glare for such lens.

It is also pointed out that silicon PIN photodiodes are preferred for the photosensitive devices such as 30 and 31 because of their excellent linearity, (output current directly proportional to the intensity of light striking the light sensitive elements of the photodiodes) rapid response time, low cost, low noise and lack of necessity of a power supply for such photodiodes. However, it will be readily apparent to persons skilled in the art that other photosensitive devices such as those previously mentioned could be used for devices 30 and 31 and it is well within the ability of those persons so skilled to substitute any of such other photosensitive devices for the photodiodes discussed herein.

Assuming that the tolerable percent of veiling glare from a lens is 5 percent the following specific operational examples of the system of the invention are given to illustrate the operation of the system when measurements are made of a first and of a second lens having tolerable and intolerable light scattering characteristics (veiling glare) respectively.

Said first lens is placed in said lens-aperture of camera obscura 25 and a measurement of veiling glare therefrom is made a previously discussed. Assuming such veiling glare to be 4 percent, the output signals derived from photodiodes 30 and 31 at such time, and having values representative of the intensity of light striking the light sensitive elements of the photodiodes, have values of 0.2 microampere and 5.0 microamperes, respectively. Such signals are supplied as inputs to amplifiers 38 and 39, respectively, and are amplified by the respective amplifiers to give output signals having values of 2.0 volts and 5.0 volts, respectively, such values of signals also being representative of the intensity of said light striking the light sensitive elements of the photodiodes. The output signals from amplifiers 38 and 39 are supplied to input terminals Z and Y, respectively, of unit 50 and such unit derives an output signal having a value of 4.0 volts and representative of the mathematical quotient of said signals, that is, a signal having a value representative of a comparison of said output signals from amplifiers 38 and 39. Said output signal from unit 50 is supplied from the output terminal OUT of such unit to input terminal J2-7 of panelmeter 51 and such meter indicates or gives a digital reading or display of 4.00 (or 4 percent) which is the veiling glare from the lens being tested.

Assuming now that said second lens is placed in the lens-aperture of camera obscura 25 and a measurement is made as previously described, if the veiling glare from such lens is 7 percent, for example, the output signals from devices 30 and 31 will have values of 0.35 microampere and 5.0 microamperes, respectively, and the output signals from amplifiers 38 and 39 will then have values of 3.5 volts and 5.0 volts, respectively. At such time, the output signal from unit 50 has a value of 7.0 volts (quotient of signals supplied to terminals Z and Y of unit 50) and such output signal is fed to panelmeter 51 which then digitally indicates or displays 7.00 (or 7 percent) which is the percentage of veiling glare from said second lens.

When, during a measurement, the value of the output signal from photodiode 30 is zero, the lens being measured at such time is considered to be a perfect lens, insofar as veiling glare is concerned, and the value of the signal supplied to panelmeter 51 is also zero and results in such meter digitally indicating or displaying 000 for a zero percent indication. When, on the other hand, the value of the output signal from diode 30 is one-tenth that of the value of the output signal from diode 31 during a measurement, the lens being tested at such time is considered to have a 10 percent veiling glare and the signals from amplifiers 38 and 39 are equal (amplifier 38 has a gain of 10 times that of amplifier 39) and the value of the output signal from unit 50 and supplied to panlemeter 51 is 10.0 volts to cause such panelmeter to digitally indicate or display 10.0 (or 10 percent).

Although there is herein shown and described in detail only one form of system embodying the invention, it will be understood that various changes and modifications may be made therein within the purview of the appended claims without departing from the spirit and scope thereof.

I claim:

1. A system for taking a measurement of veiling glare from an optical lens, such system comprising, in combination;
    A. a panel having a reflective surface and a light trap in the vicinity of the center of said surface;
    B. means for illuminating said reflective surface;
    C. a camera obscura having a lens-aperture for holding said lens and facing said panel at a distance selected in accordance with the focal range of the camera obscura when said lens is held in said lens-aperture, such camera obscura adapted for bringing said light trap into focus when said lens is in said lens-aperture;
    D. a first photosensitive device at the back of said camera obscura for receiving only light scattered in said lens when the lens is in said camera obscura and said reflective surface is illuminated, such device deriving a first electrical signal having a value representative of the intensity of said scattered light;
    E. a second photosensitive device at the back of said camera obscura for receiving reflected from an area of said reflective surface surrounding said light trap and deriving a second electrical signal having a vlue representative of the intensity of said reflected light;
    F. means receiving said first and second signals and responsive thereto for deriving a third electrical signal having a value representative of the results of a comparison of the values of the first and second signals; and
    G. means receiving said third signal and resonsive thereto for giving an indication in accordance with the value of such received signal.

2. A system in accordance with claim 1 and in which said photosensitive devices are PIN photodiodes.

3. A system in accordance with claim 1 and in which said panel and said camera obscura are at least substantially enclosed in a chamber having light reflective inner surfaces.

4. A system in accordance with claim 3 and in which said photosensitive devices are PIN photodiodes.

5. A system for measuring veiling glare from an optical lens, such system comprising, in combination;
    A. a box having reflective inner surfaces and a length in accordance with the focal range of said lens, an end wall of such box having an aperture extending therethrough in the vicinity of the center of such wall with an optimumly light-absorbing surface defining the perimetric bounds of such aperture;
    B. a light trap disposed against the outer surface of said end wall of said box and in line with said aperture;
    C. means for illuminating at least the inner surface of said end wall of said box;
    D. a movable camera obscura having a lens-aperture suitable for holding said lens and a translucent wall opposite such lens-aperture to aid in focusing, such camera obscura otherwise being lightproof and disposed adjacent the second end of said box for aligning with said aperture in said box and bringing such aperture into focus for receiving an image of the aperture on said translucent wall when said lens is in said lens-aperture;
    E. a first photosensitive supported in said camera obscura for receiving said image of said aperture in said box when such box is moved a selected relatively minute distance in the plane of said translucent wall, said device being responsive to the intensity of any light scattered in said lens due to said glare and for deriving a first signal having a value representative of such scattered light;
    F. a second photosensitive device supported in said camera obscura for receiving, through said lens, light reflected from an area of the inner surface surrounding said aperture in said box, such second device being responsive to said reflected light for deriving a second signal having a value representative of the intensity of such reflected light;

G. means receiving said signals and responsive thereto for deriving a third signal having a value respresentative of the results of a comparison of the values of said first and second signals;

H. means receiving said third signal and responsive thereto for giving an indication of the value thereof.

6. A system in accordance with claim 5 and in which said translucent wall is a ground glass sheet.

7. A system in accordance with claim 5 and in which said photosensitive devices are PIN photodiodes.

8. A system in accordance with claim 6 and in which said photosensitive devices are PIN photodiodes.

9. A method of measurement of the veiling glare of an optical lens, such method comprising;

A. illuminating a reflective screen having in the vicinity of the center thereof a light trap, B. inserting said lens in the lens-aperture of a camera obscura, C. disposing in the back of said camera obscura a pair of photosensitive devices each adapted to derive an associated electrical signal having a value representative of the intensity of light striking the light-sensitive element of each respective photosensitive device, D. focusing said camera obscura at said screen to beam an image of said light trap through said lens and at said light sensitive element of a first of said photosensitive devices and simultaneously beam an area of said screen surrounding said light trap through said lens and at the light sensitive element of the second of said photosensitive devices, E. making a comparison of the electrical signals, derived by said photosensitive devices when said screen is illuminated and said camera obscura is focused as mentioned, to derive a third electrical signal having a value representative of the comparison made; and F. transmitting said third signal to an indication device to give a visual display of the value of such third signal and thereby the measurement made of said veiling glare.

10. The method in accordance with claim 9 and in which said photosensitive devices are PIN photodiodes and said indication device is a meter.

* * * * *

UNITED STATES PATENT OFFICE
CERTIFICATE OF CORRECTION

Patent No. 3,776,638    Dated December 4, 1973

Inventor(s) Michael P. Teter

It is certified that error appears in the above-identified patent and that said Letters Patent are hereby corrected as shown below:

Column 6, line 60, "a" should be --as--; Column 7, line 46, "panlemeter" should be --panelmeter--; Column 8, line 9, "for receiving reflected" should be --for receiving light reflected--; Column 8, line 12, "vlue" should be --value--; Column 8, line 19, "resonsive" should be --responsive--; Column 8, line 53, "photosensitive supported" should be --photosensitive device supported--; and Column 9, lines 2 and 3, "respresentative" should be --representative--.

Signed and sealed this 9th day of April 1974.

(SEAL)
Attest:

EDWARD M. FLETCHER, JR.
Attesting Officer

C. MARSHALL DANN
Commissioner of Patents